(12) United States Patent
Murg et al.

(10) Patent No.: US 10,695,816 B2
(45) Date of Patent: Jun. 30, 2020

(54) APPARATUS AND METHOD FOR FLARING A TUBE

(71) Applicant: Stride Tool, LLC, Glenwillow, OH (US)

(72) Inventors: Leonard R. Murg, Eastlake, OH (US); Ryan Jarvis, Glenwillow, OH (US)

(73) Assignee: STRIDE TOOL, LLC, Glenwillow, OH (US)

( * ) Notice: Subject to any disclaimer, the term of this patent is extended or adjusted under 35 U.S.C. 154(b) by 208 days.

(21) Appl. No.: 15/720,479

(22) Filed: Sep. 29, 2017

(65) Prior Publication Data

US 2018/0099326 A1 Apr. 12, 2018

Related U.S. Application Data

(60) Provisional application No. 62/404,821, filed on Oct. 6, 2016.

(51) Int. Cl.
*B21D 41/02* (2006.01)

(52) U.S. Cl.
CPC .................. *B21D 41/021* (2013.01)

(58) Field of Classification Search
CPC ...... B21D 39/08; B21D 39/20; B21D 39/203; B21D 41/02; B21D 41/021; B21D 41/025; B21D 41/026; B29C 57/02; B29C 57/04; B29C 57/045; B29C 57/08
See application file for complete search history.

(56) References Cited

U.S. PATENT DOCUMENTS

| | | | | |
|---|---|---|---|---|
| 2,737,225 A | * | 3/1956 | Jasinski | B21D 41/021 408/104 |
| 2,774,408 A | * | 12/1956 | Franck | B21D 41/04 235/62 B |
| 3,192,758 A | | 7/1965 | Catlin et al. | |
| 3,195,337 A | * | 7/1965 | Janik | B21D 41/021 72/115 |
| 3,209,571 A | * | 10/1965 | Wilson | B21D 41/021 72/124 |
| 3,785,193 A | * | 1/1974 | Kinley | B21D 39/20 166/277 |

(Continued)

FOREIGN PATENT DOCUMENTS

WO WO-2015153376 A1 * 10/2015 ......... A61B 17/8875

*Primary Examiner* — Debra M Sullivan
*Assistant Examiner* — Stephen Floyd London
(74) *Attorney, Agent, or Firm* — Tarolli, Sundheim, Covell & Tummino LLP

(57) ABSTRACT

An adjustable insertion-depth tube flaring tool is provided. A selector housing is disposed on a yoke. An adjustment nut is disposed within the selector housing. An adjustment screw is disposed within at least one of the selector housing and the yoke. A clutch housing has therein at least one biasing element, at least one lower clutch plate, and at least one upper clutch plate. An upper clutch plate rotation supporting element interacts with a lower clutch plate rotation supporting element to facilitate rotation of the upper clutch plate over the lower clutch plate in one direction. At least a portion of a shaft proximal end and an upper clutch plate inner wall are shaped to interact with one another in such a manner that the upper clutch plate is selectively prevented from rotating about the shaft proximal end when the upper clutch plate is disposed on the shaft proximal end.

3 Claims, 11 Drawing Sheets

(56) References Cited

U.S. PATENT DOCUMENTS

| | | | | |
|---|---|---|---|---|
| 5,046,349 A | * | 9/1991 | Velte | B21D 41/026 |
| | | | | 72/393 |
| 6,508,097 B2 | | 1/2003 | Ose | |
| 8,869,581 B2 | * | 10/2014 | Houle | B21D 41/021 |
| | | | | 72/117 |
| 2006/0243014 A1 | * | 11/2006 | Kao | B21D 41/023 |
| | | | | 72/117 |

* cited by examiner

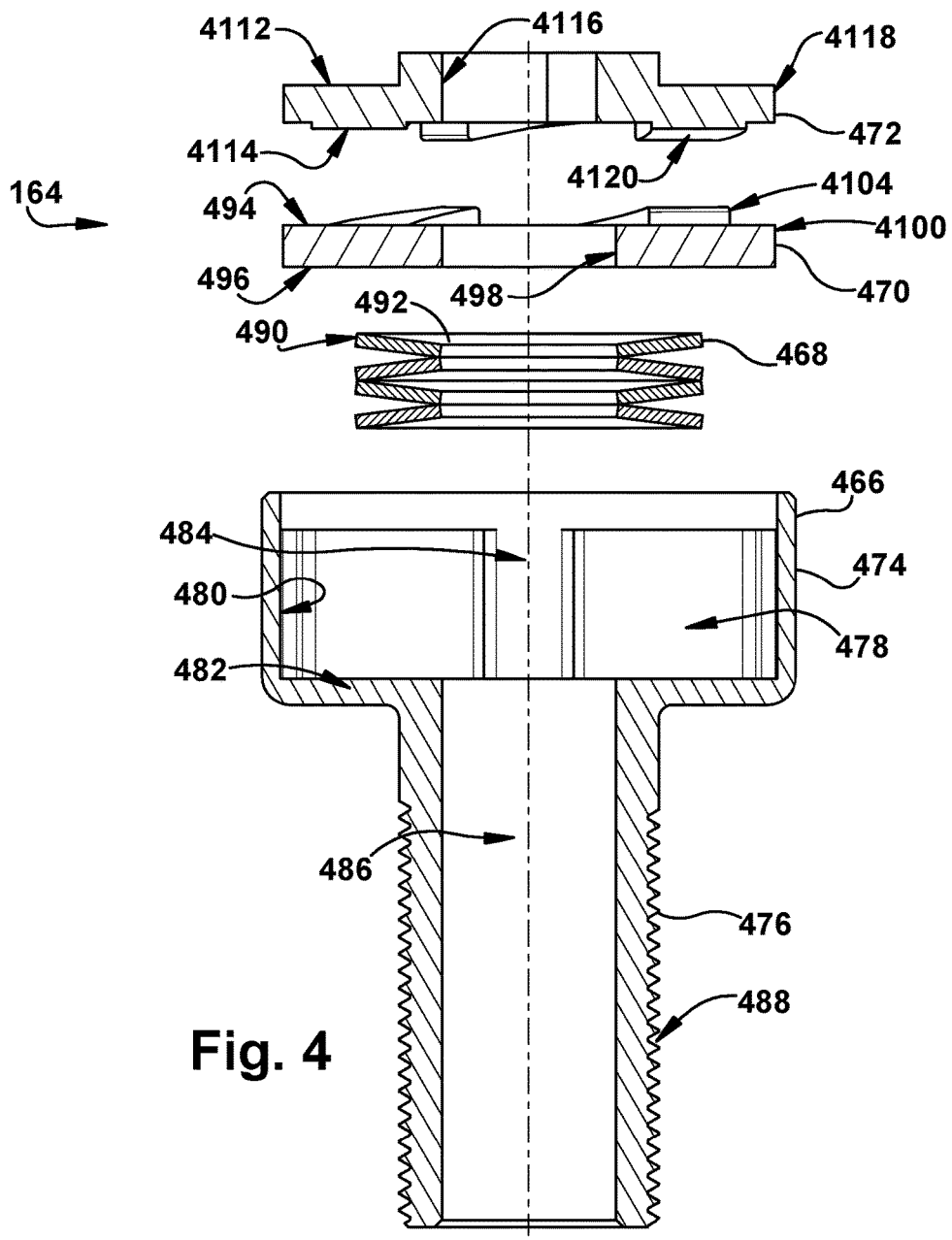
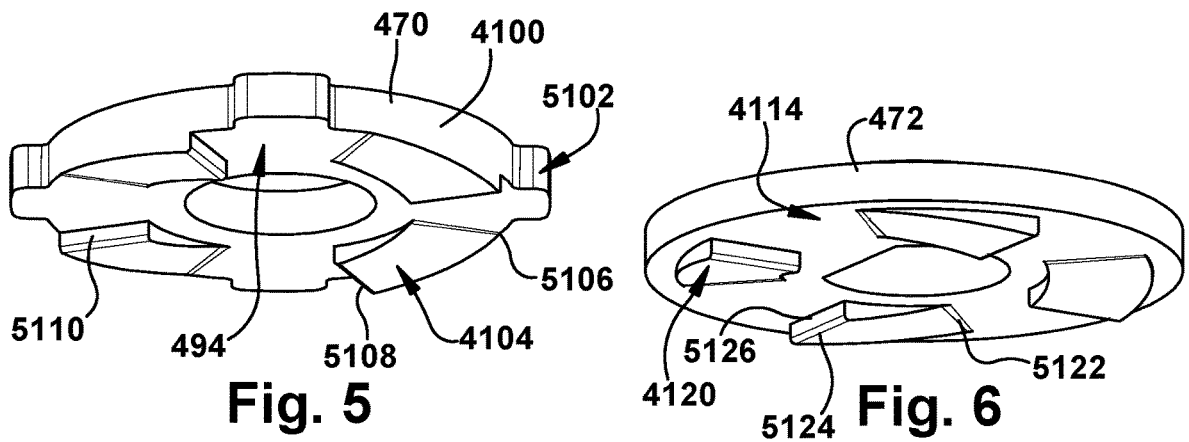
Fig. 4
Fig. 5
Fig. 6

APPARATUS AND METHOD FOR FLARING A TUBE

RELATED APPLICATION

This application claims priority from U.S. Provisional Application No. 62/404,821, filed 6 Oct. 2016, the subject matter of which is incorporated herein by reference in its entirety.

TECHNICAL FIELD

This disclosure relates to an apparatus and method for use of an adjustable insertion-depth tube flaring tool and, more particularly, to an apparatus and method for flaring a tube.

BACKGROUND

Flaring and expanding tools are used to expand the internal and/or external dimensions of the end of a tube or pipe for swaging or joining pipe or for other plumbing and piping applications. Generally, a tool or head is longitudinally downwardly inserted into the end of the tube, forcing the tube material outward to plastically deform the tube end into the desired shape or flare. Occasionally, it may be desirable by the user to adjust the depth, or the longitudinally downward distance, in which the tool or head is able to travel longitudinally downward.

SUMMARY

In an aspect, an adjustable insertion-depth tube flaring tool is provided. The adjustable insertion-depth tube flaring tool includes a yoke having a yoke upper portion and a yoke lower portion. The yoke upper portion has a yoke opening. A selector assembly has a selector housing having a selector housing inner wall and a selector housing outer wall. The selector housing inner wall has at least one adjustment nut projection recess. At least a portion of the selector housing inner wall is larger in diameter than, and is disposed on, the yoke upper portion. An adjustment nut is disposed within the selector housing. The adjustment nut has an adjustment nut inner lumen and an adjustment nut outer wall. The adjustment nut inner lumen is at least partially threaded. The adjustment nut outer wall is larger in diameter than the yoke opening. The adjustment nut outer wall has at least one adjustment nut projection. The adjustment nut projection slidingly engages the adjustment nut projection recess of the selector housing. An adjustment screw is disposed within at least one of the selector housing and the yoke. The adjustment screw has an adjustment screw inner lumen and an adjustment screw outer wall. The adjustment screw inner lumen is at least partially threaded. The adjustment screw outer wall has an adjustment screw outer wall upper threaded portion and an adjustment screw outer wall lower threaded portion. The adjustment screw outer wall upper threaded portion is larger in diameter than the adjustment screw outer wall lower threaded portion. The adjustment screw outer wall upper threaded portion is smaller in diameter than the adjustment nut inner lumen. The adjustment screw outer wall upper threaded portion is for at least partially engaging a threaded portion of the adjustment nut inner lumen. A clutch assembly has a clutch having a clutch housing and a clutch threaded portion. The clutch housing has a clutch housing recess that is defined by a clutch housing inner wall and a clutch housing recess floor. The clutch housing inner wall has at least one lower clutch plate projection recess. The clutch threaded portion extends longitudinally downwardly from the clutch housing recess floor. The clutch threaded portion has a clutch threaded portion inner lumen. The clutch threaded portion inner lumen is in fluid communication with the clutch housing recess. The clutch threaded portion has a clutch threaded portion outer wall which is at least partially threaded. The clutch threaded portion outer wall is smaller in diameter than the adjustment screw inner lumen. The clutch threaded portion outer wall is for at least partially engaging the threading on the adjustment screw inner lumen. At least one biasing element is disposed in the housing recess. The at least one biasing element has a biasing element inner wall. At least one lower clutch plate is disposed in the housing recess on the at least one biasing element. The lower clutch plate has a lower clutch plate inner wall and a lower clutch plate outer wall. The lower clutch plate outer wall has at least one lower clutch plate projection for at least partially engaging a corresponding lower clutch plate projection recess in the clutch housing inner wall. The engagement of the lower clutch plate projection in the corresponding lower clutch plate projection recess substantially prevents the rotation of the lower clutch plate in the housing recess. A lower clutch plate first surface has at least one lower clutch plate rotation supporting element. At least one upper clutch plate is disposed on the lower clutch plate and at least partially located in the housing recess. The upper clutch plate has an upper clutch plate inner wall and an upper clutch plate outer wall. An upper clutch plate second surface has at least one upper clutch plate rotation supporting element. The upper clutch plate rotation supporting element interacts with the lower clutch plate rotation supporting element to facilitate rotation of the upper clutch plate over the lower clutch plate in one direction. A shaft has a shaft proximal end, a shaft distal end, and a shaft body that extends between the shaft proximal end and the shaft distal end. The shaft proximal end has an upper clutch plate receiving portion. The upper clutch plate receiving portion is smaller in diameter than the shaft body. The upper clutch plate receiving portion is smaller in diameter than the upper clutch plate inner wall. The shaft body at least partially extends through the clutch assembly. The shaft body has a larger outer diameter than the diameter of the upper clutch plate inner wall. The shaft distal end has a flaring cone. The flaring cone has a flaring cone apex which points toward the yoke lower portion. The flaring cone has a tube flaring surface and at least one roller recess for at least partially receiving a conical roller. A handle is attached to the shaft proximal end. The upper clutch plate receiving portion and the upper clutch plate inner wall are shaped to interact with one another in such a manner that the upper clutch plate is selectively prevented from rotating about the upper clutch plate receiving portion when the upper clutch plate is disposed on the upper clutch plate receiving portion.

In an aspect, a method for flaring a tube is provided. An adjustable insertion-depth tube flaring tool is provided. The adjustable insertion-depth tube flaring tool has a yoke. A selector housing has at least one adjustment nut projection recess. The selector housing is disposed on the yoke. An adjustment nut is disposed within the selector housing. An adjustment nut outer wall has at least one adjustment nut projection. The adjustment nut projection slidingly engages the adjustment nut projection recess of the selector housing. An adjustment screw is disposed within at least one of the selector housing and the yoke. An adjustment screw outer wall upper threaded portion is for at least partially engaging a threaded portion of an adjustment nut inner lumen. A clutch has a clutch housing and a clutch threaded portion that extends longitudinally downwardly from the clutch housing. The clutch housing has therein at least one biasing element, at least one lower clutch plate, and at least one upper clutch plate. The lower clutch plate has a lower clutch plate rotation supporting element. The upper clutch plate has an upper clutch plate rotation supporting element. The clutch threaded portion is for at least partially engaging a threaded portion of an adjustment screw inner lumen. A shaft has a shaft proximal end and a shaft distal end. At least a portion of the shaft proximal and an upper clutch plate inner wall are shaped to interact with one another in such a manner that the upper clutch plate is selectively prevented from rotating about the upper clutch plate receiving portion when the upper clutch plate is disposed on the shaft proximal end. The shaft distal end has a flaring cone at least a portion of the shaft that extends through the clutch. A handle is attached to the shaft proximal end. The selector housing is moved longitudinally upward to cause the selector housing to operatively engage the adjustment nut. With the selector housing operatively engaging the adjustment nut, the selector housing is laterally rotated a predetermined distance to select a predetermined longitudinal distance for the shaft to travel longitudinally downward. The lateral rotation of the selector housing causes the engaged adjustment nut to travel longitudinally upward or downward along the adjustment screw outer wall upper threaded portion. The selector housing is moved longitudinally downward to cause the selector housing to operatively disengage the adjustment nut. The tube is inserted longitudinally upward through the yoke until an open end of the tube at least partially contacts the flaring cone. The handle is laterally rotated to drive the shaft, the flaring cone, and the clutch the predetermined distance longitudinally downward. The driving of the flaring cone longitudinally downward causes the flaring cone to move longitudinally downward into the open end of the tube. With the flaring cone at least partially within the tube and the shaft prevented from traveling further longitudinally downward than the predetermined distance, the tube is flared by laterally rotating the handle to cause the flaring cone to laterally rotate within the tube. The lateral rotation of the handle causes the shaft and the upper clutch plate to laterally rotate. The upper clutch plate rotation supporting element interacts with the lower clutch plate rotation supporting element to facilitate rotation of the upper clutch plate with respect to the lower clutch plate in a ratcheting manner. The lateral rotation of the upper clutch plate with respect to the lower clutch plate permits the shaft and the flaring cone to mutually rotate.

In an aspect, an adjustable insertion-depth tube flaring tool is provided. The adjustable insertion-depth tube flaring tool includes a yoke. A selector housing has at least one adjustment nut projection recess. The selector housing is disposed on the yoke. An adjustment nut is disposed within the selector housing. An adjustment nut outer wall has at least one adjustment nut projection. The adjustment nut projection slidingly engages the adjustment nut projection recess of the selector housing. An adjustment screw is disposed within at least one of the selector housing and the yoke. An adjustment screw outer wall upper threaded portion is for at least partially engaging a threaded portion of an adjustment nut inner lumen. A clutch has a clutch housing and a clutch threaded portion that extends longitudinally downwardly from the clutch housing. The clutch housing has therein at least one biasing element, at least one lower clutch plate, and at least one upper clutch plate. An upper clutch plate rotation supporting element interacts with a lower clutch plate rotation supporting element to facilitate rotation of the upper clutch plate over the lower clutch plate in one direction. The clutch threaded portion is for at least partially engaging a threaded portion of an adjustment screw inner lumen. A shaft has a shaft proximal end and a shaft distal end. The shaft distal end has a flaring cone. At least a portion of the shaft extends through the clutch. A handle is attached to the shaft proximal end. At least a portion of the shaft proximal end and an upper clutch plate inner wall are shaped to interact with one another in such a manner that the upper clutch plate is selectively prevented from rotating about the shaft proximal end when the upper clutch plate is disposed on the shaft proximal end.

BRIEF DESCRIPTION OF THE DRAWINGS

For a better understanding, reference may be made to the accompanying drawings, in which:

FIG. 4 is a front cross-sectional exploded view of elements of the aspect of FIG. 1;

FIG. 5 is a top view of an element of the aspect of FIG. 1;

FIG. 6 is a bottom view of an element of the aspect of FIG. 1;

DESCRIPTION OF ASPECTS OF THE DISCLOSURE

Unless defined otherwise, all technical and scientific terms used herein have the same meaning as is commonly understood by one of skill in the art to which the present disclosure pertains.

As used herein, the term "user" can be used interchangeably to refer to an individual who prepares for, assists, and/or operates a device.

As used herein, the singular forms "a," "an" and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

As used herein, phrases such as "between X and Y" can be interpreted to include X and Y.

It will be understood that when an element is referred to as being "on," "attached" to, "contacting," etc., another element, it can be directly on, attached to or contacting the other element or intervening elements may also be present. A structure or feature that is disposed "adjacent" another feature may not have portions that overlap or underlie the adjacent feature.

Spatially relative terms, such as "lower," "over," "upper" and the like, may be used herein for ease of description to describe one element or feature's relationship to another element(s) or feature(s) as illustrated in the Figures. It will be understood that the spatially relative terms can encompass different orientations of a device in use or operation, in addition to the orientation depicted in the Figures. For example, if a device in the Figures is inverted, elements described as "over" other elements or features would then be oriented "under" the other elements or features.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or Figures unless specifically indicated otherwise.

The invention comprises, consists of, or consists essentially of the following features, in any combination.

Figure 1:
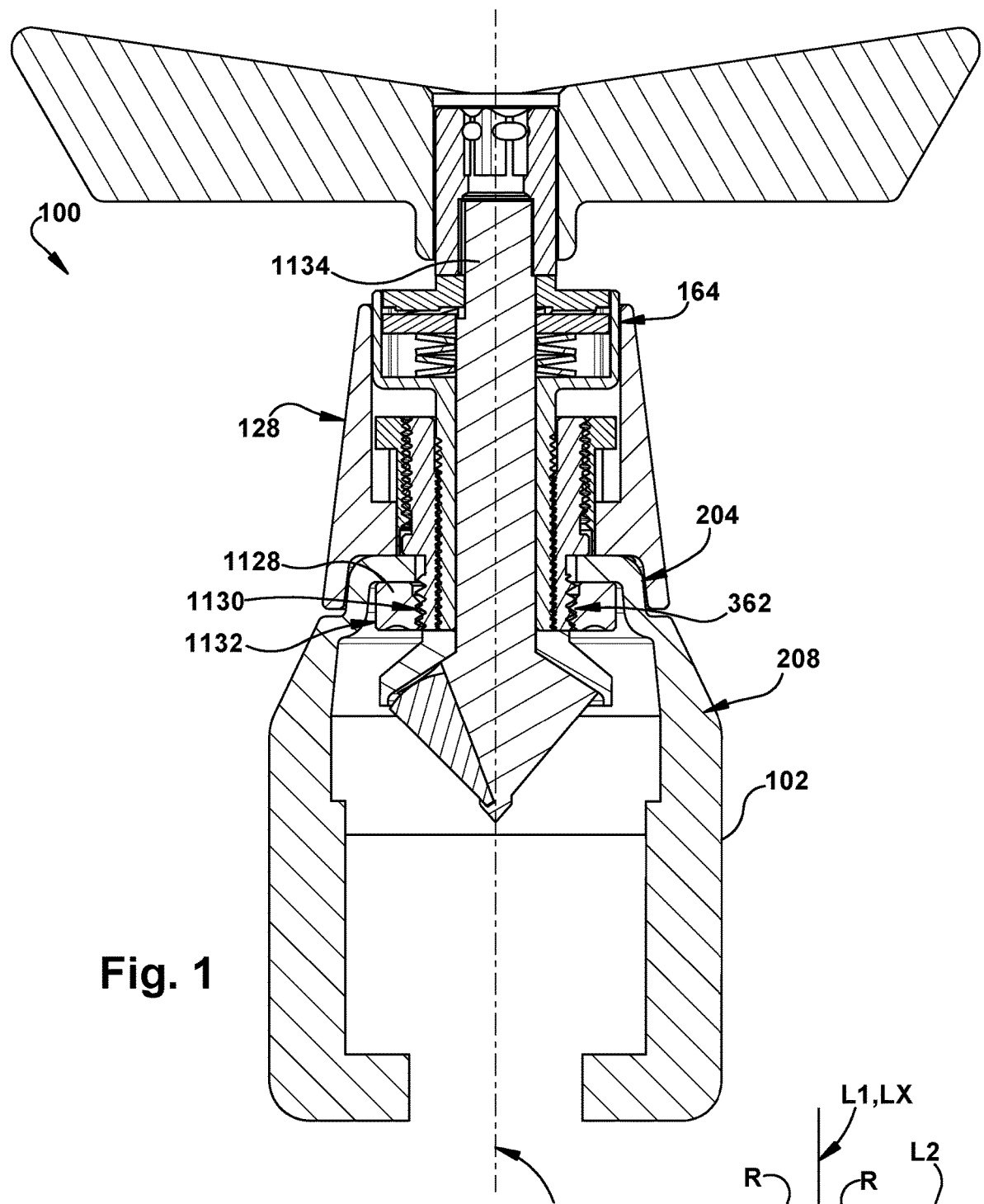
FIG. 1 is a front cross-sectional view of an adjustable insertion-depth tube flaring tool according to one aspect of the present invention.
Figure 1A:
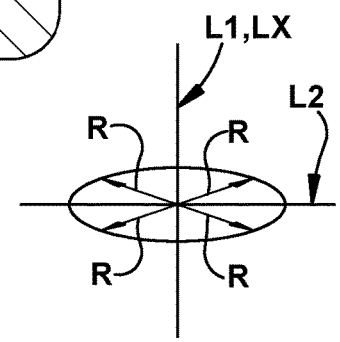
FIG. 1a is an example depiction of the directional orientation of the aspect of FIG. 1.
Figure 2:
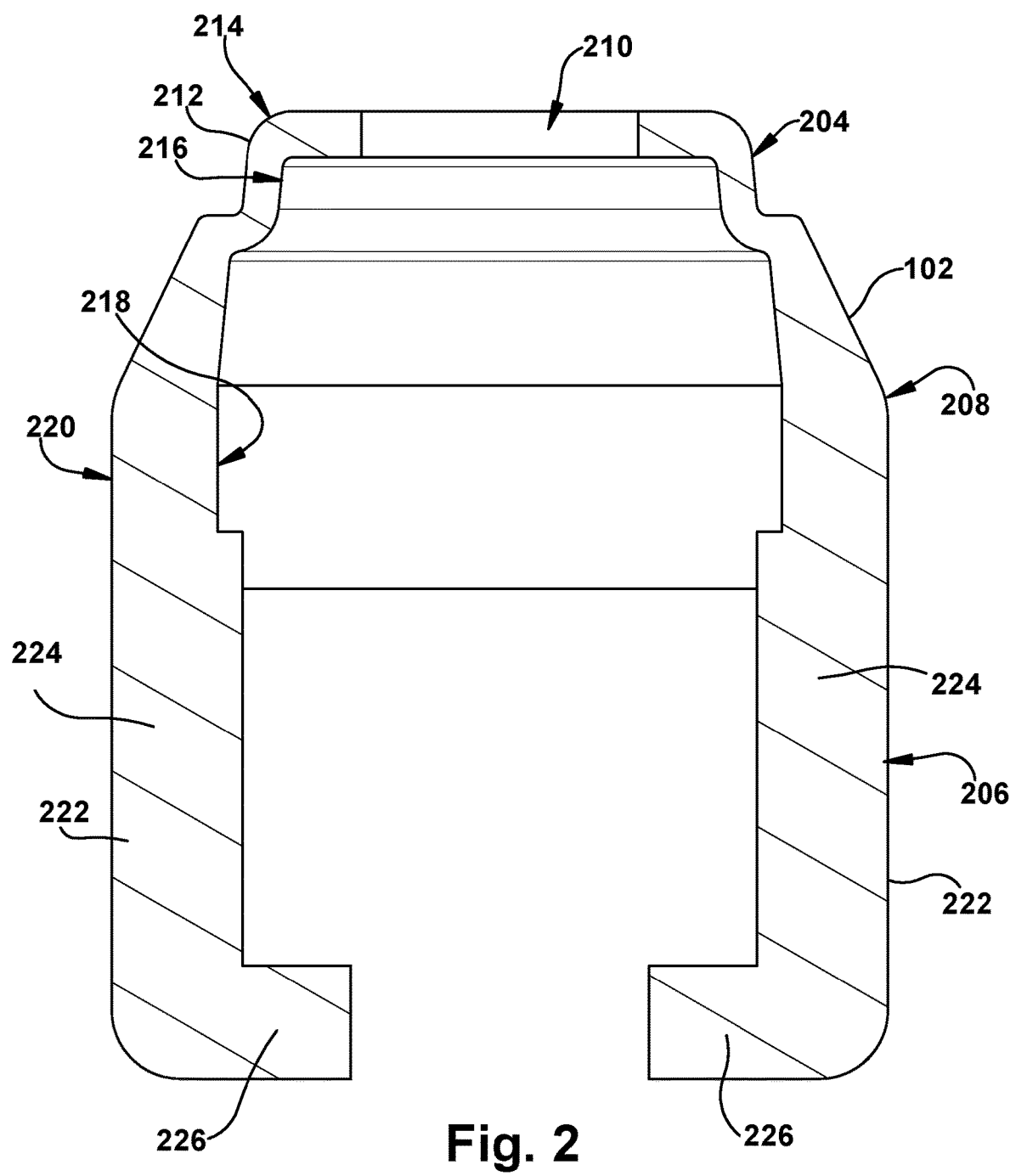
FIG. 2 is a front cross-sectional view of an element of the aspect of FIG. 1.

FIG. 1 depicts an adjustable insertion-depth tube flaring tool 100 having a yoke 102. As shown in FIG. 2, the yoke 102 has a yoke upper portion 204, a yoke lower portion 206, and a yoke central portion 208 that longitudinally extends between the yoke upper portion 204 and the yoke lower portion 206. The term "longitudinal" is used herein to indicate a substantially vertical direction, shown as L1 in FIG. 1a, in the orientation of FIG. 1. The yoke upper portion 204 has a yoke opening 210 and a radially extending yoke shoulder 212. The term "radial" is used herein to indicate a direction substantially perpendicular to the "longitudinal" direction, and is shown via arrows R in FIG. 1a extending outward from a central longitudinal axis, shown as LX in FIGS. 1-1a, in the orientation of FIG. 1. The yoke shoulder 212 has a yoke shoulder outer surface 214 and a yoke shoulder inner surface 216. The yoke central portion 208 has a yoke central portion inner wall 218 and a yoke central portion outer wall 220. The yoke central portion inner wall 218 is radially spaced, and oppositely facing, from the yoke central portion outer wall 220. The yoke lower portion 206 has at least two yoke arms 222 that extend longitudinally downward from the yoke central portion 208. Each of the yoke arms 222 has a yoke arm longitudinal portion 224 and a yoke arm lateral portion 226. The term "lateral" is used herein to indicate a direction substantially perpendicular to the "longitudinal" direction, and is shown as the horizontal direction, shown as L2 in FIG. 1a, in the orientation of FIG. 1. The yoke arm longitudinal portion 224 is substantially perpendicular to the yoke arm lateral portion 226. Each of the yoke arm lateral portions 226 laterally extends toward, and is oppositely facing from, another of the yoke arm lateral portions 226.

Figure 3:
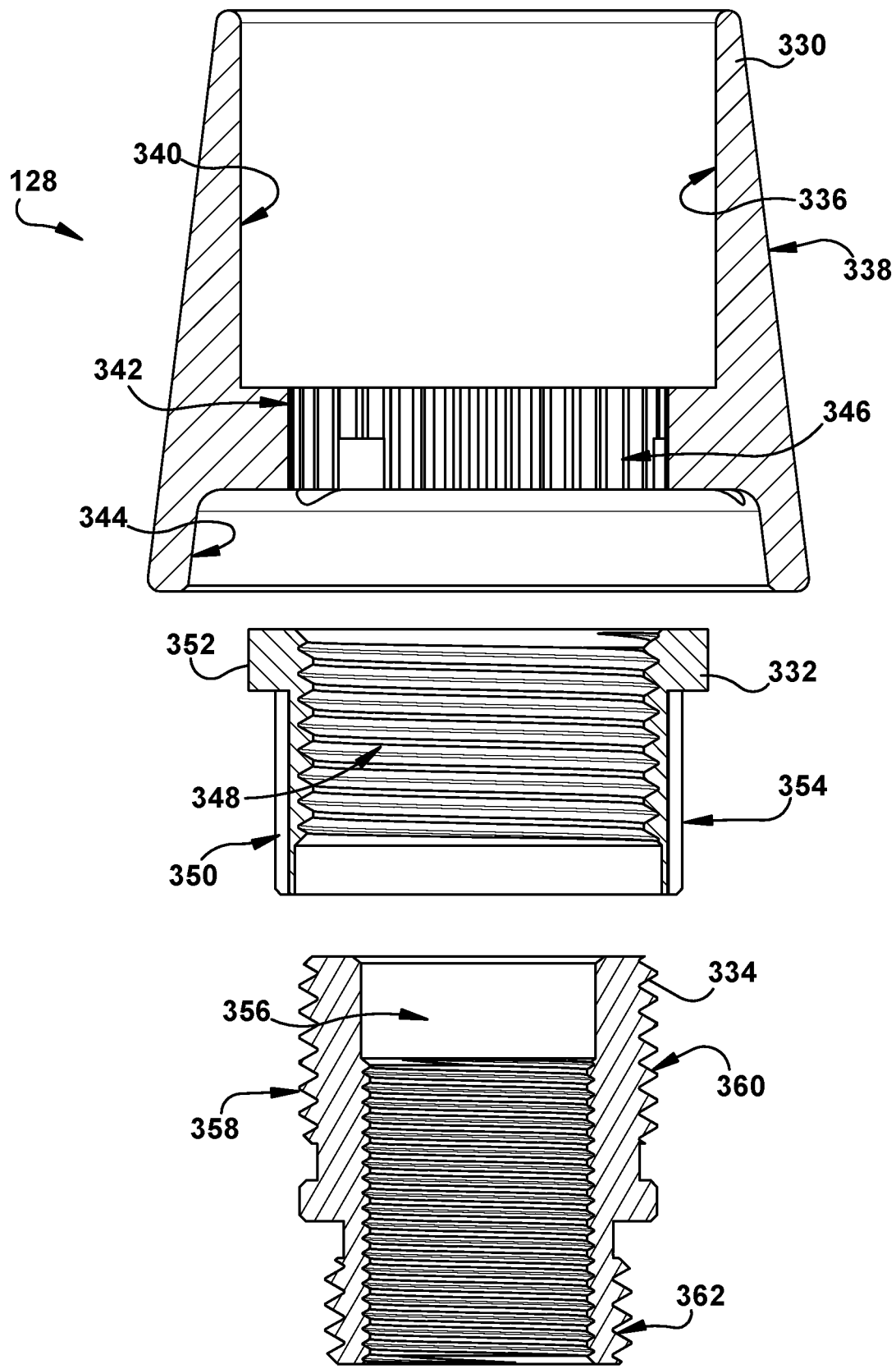
FIG. 3 is a front cross-sectional exploded view of elements of the aspect of FIG. 1.

As shown in FIGS. 1 and 3, the adjustable insertion-depth tube flaring tool 100 has a selector assembly 128. As shown in FIG. 3, the selector assembly 128 has a selector housing 330, an adjustment nut 332, and an adjustment screw 334. The selector housing 330 has a selector housing inner wall 336 and a selector housing outer wall 338. The selector housing inner wall 336 is radially spaced, and oppositely facing, from the selector housing outer wall 338. The selector housing inner wall 336 has a selector housing inner wall upper portion 340, a selector housing inner wall central portion 342, and a selector housing inner wall lower portion 344. The selector housing inner wall central portion 342 has at least one adjustment nut projection recess 346. The adjustment nut projection recess 346 may longitudinally extend on the selector housing inner wall central portion 342 between the selector housing inner wall upper portion 340 and the selector housing inner wall lower portion 344. Each of the at least one adjustment nut projection recess 346 may be located laterally about the selector housing inner wall central portion 342. The selector housing inner wall central portion 342 may be smaller in diameter than the yoke shoulder outer surface 214. The selector housing inner wall lower portion 344 is larger in diameter than, and may be disposed on, the yoke shoulder outer surface 214. The selector housing 330 may be removably disposed on the yoke shoulder outer surface 214.

The adjustment nut 332 has an adjustment nut inner lumen 348 and an adjustment nut outer wall 350. The adjustment nut inner lumen 348 is at least partially threaded. At least a portion of the adjustment nut outer wall 350 may be larger in diameter than the yoke opening 210. The adjustment nut outer wall 350 has a radially extending adjustment nut rim 352 and at least one adjustment nut projection 354. The adjustment nut 332 may be disposed within the selector housing 330. The adjustment nut rim 352 may have an outer diameter that is smaller than the selector housing inner wall upper portion 340, and is larger than diameter of the selector housing inner wall central portion 342. The at least one adjustment nut projection 354 longitudinally extends downward from the adjustment nut rim 352. The adjustment nut projection 354 may slidingly engage the adjustment nut projection recess 346 of the selector housing 330. In other words, when the adjustment nut projection 354 engages a corresponding adjustment nut projection recess 346, the selector housing 330 may be directed longitudinally upward and/or downward in relation to the adjustment nut 332.

The adjustment screw 334 may be disposed within at least one of the selector housing 330 and the yoke 102. The adjustment screw 334 has an adjustment screw inner lumen 356 and an adjustment screw outer wall 358. The adjustment screw inner lumen 356 may be at least partially threaded. The adjustment screw outer wall 358 has an adjustment screw outer wall upper threaded portion 360 and an adjustment screw outer wall lower threaded portion 362. The adjustment screw outer wall upper threaded portion 360 may be larger in diameter than the adjustment screw outer wall lower threaded portion 362. The adjustment screw outer wall upper threaded portion 360 may be smaller in diameter than the adjustment nut inner lumen 348. The adjustment screw outer wall upper threaded portion 360 may at least partially engage a threaded portion of the adjustment nut inner lumen 348.

The adjustment screw outer wall upper threaded portion 360 may be larger in diameter than the yoke opening 210. The adjustment screw outer wall lower threaded portion 362 may be smaller in diameter than the yoke opening 210. When the adjustment screw outer wall lower threaded portion 362 is smaller in diameter than the yoke opening 210, the adjustment screw outer wall lower threaded portion 362 may be inserted through the yoke opening 210 such that the adjustment screw outer wall lower threaded portion 362 is positioned at least partially within the yoke 102 and the adjustment screw outer wall upper threaded portion 360 is positioned at least partially in the selector housing 330. In such case, at least a portion of the adjustment screw outer wall upper threaded portion 360 may be disposed on the yoke shoulder outer surface 214.

As shown in FIGS. 1 and 4, the adjustable insertion-depth tube flaring tool 100 has a clutch assembly 164. The clutch assembly 164 has a clutch 466, at least one biasing element 468, a lower clutch plate 470, and an upper clutch plate 472. The clutch 466 has a clutch housing 474 and a clutch threaded portion 476. The clutch housing 474 has a clutch housing recess 478 that is defined by a clutch housing inner wall 480 and a clutch housing recess floor 482. The clutch housing inner wall 480 may have at least one lower clutch plate projection recess 484. The lower clutch plate projection recess 484 may extend longitudinally on the clutch housing inner wall 480. The lower clutch plate projection recess 484 may be located laterally about the clutch housing inner wall 480. The clutch threaded portion 476 extends longitudinally downwardly from the clutch housing recess floor 482. The clutch threaded portion 476 has a clutch threaded portion inner lumen 486. The clutch threaded portion inner lumen 486 may be in fluid communication with the clutch housing recess 478. The clutch threaded portion inner lumen 486 may be smaller in diameter than the clutch housing recess 478. The clutch threaded portion 476 has a clutch threaded portion outer wall 488 which may be at least partially threaded. The clutch threaded portion outer wall 488 may be smaller in diameter than the adjustment screw inner lumen 356. The clutch threaded portion outer wall 488 may at least partially engage the threading on the adjustment screw inner lumen 356.

The at least one biasing element 468 may be disposed in the clutch housing recess 478. The at least one biasing element 468 has a biasing element outer wall 490 and a biasing element inner wall 492. The biasing element outer wall 490 is radially spaced, and oppositely facing, from the biasing element inner wall 492. The biasing element outer wall 490 may be smaller in diameter than the diameter of the clutch housing inner wall 480. The at least one biasing element 468 may include at least one of a Belleville washer, a spring, or any other appropriate biasing element. The biasing element 648 may include at least two Belleville washers stacked in series.

The lower clutch 470 plate may be disposed in the clutch housing recess 478 on the at least one biasing element 468. The lower clutch plate 470 has a lower clutch plate first surface 494 and a lower clutch place second surface 496. The lower clutch plate first surface 494 is longitudinally spaced, and oppositely facing, from the lower clutch plate second surface 496. The lower clutch plate 470 has a lower clutch plate inner wall 498 and a lower clutch plate outer wall 4100. The lower clutch plate inner wall 498 is radially spaced, and oppositely facing, from the lower clutch plate outer wall 4100. The lower clutch plate inner wall 498 and the lower clutch plate outer wall 4100 both longitudinally extend between the lower clutch plate first surface 494 and the lower clutch plate second surface 496. The lower clutch plate outer wall 4100 may be smaller in diameter than the diameter of the clutch housing inner wall 480.

As shown in FIG. 5, the lower clutch plate outer wall 4100 may have at least one lower clutch plate projection 5102 that may at least partially engage a corresponding lower clutch plate projection recess 484 in the clutch housing inner wall 480. The engagement of the lower clutch plate projection 5102 in the corresponding lower clutch plate projection recess 484 substantially prevents the lateral rotation of the lower clutch plate 470 in the clutch housing recess 478. As shown in FIGS. 4-5, the lower clutch plate first surface 494 may have at least one lower clutch plate rotation supporting element 4104. As shown in FIG. 5, the lower clutch plate rotation supporting element 4104 may have a lower clutch plate rotation supporting element first end 5106 that is laterally spaced, and substantially oppositely facing, from a lower clutch plate rotation supporting element second end 5108. The lower clutch plate rotation supporting element 4104 may longitudinally downwardly incline, in the orientation of FIG. 5, between the lower clutch plate rotation supporting element first and second ends 5106, 5108. The lower clutch plate rotation supporting element second end 5108 may have a lower clutch plate rotation supporting element locking edge 5110.

Referring back to FIG. 4, the at least one upper clutch plate 472 may be at least partially located in the clutch housing recess 478 on the lower clutch plate 494. The upper clutch plate 472 has an upper clutch plate first surface 4112 and an upper clutch place second surface 4114. The upper clutch plate first surface 4112 is longitudinally spaced, and oppositely facing, from the upper clutch plate second surface 4114. The upper clutch plate 472 has an upper clutch plate inner wall 4116 and an upper clutch plate outer wall 4118. The upper clutch plate inner wall 4116 is radially spaced, and oppositely facing, from the upper clutch plate outer wall 4118. The upper clutch plate inner wall 4116 and the upper clutch plate outer wall 4118 both longitudinally extend between the upper clutch plate first surface 4112 and the upper clutch plate second surface 4114. The upper clutch plate outer wall 4118 may be smaller in diameter than the diameter of the clutch housing inner wall 480.

As shown in FIGS. 4 and 6, the upper clutch plate second surface 4114 may have at least one upper clutch plate rotation supporting element 4120. As shown in FIG. 6, the upper clutch plate rotation supporting element 4120 may have an upper clutch plate rotation supporting element first end 5122 that is laterally spaced, and substantially oppositely facing, from an upper clutch plate rotation supporting element second end 5124. The upper clutch plate rotation supporting element 4120 may longitudinally downwardly incline, in the orientation of FIG. 6, between the upper clutch plate rotation supporting element first and second ends 5122, 5124. The upper clutch plate rotation supporting element second end 5124 may have an upper clutch plate rotation supporting element locking edge 5126.

The upper clutch plate rotation supporting element 4120 may interact with the lower clutch plate rotation supporting element 4104 to facilitate lateral rotation of the upper clutch plate 472 over the lower clutch plate 470 in one direction, such as a first direction. When the upper clutch plate 472 laterally rotates over the lower clutch plate 470 in the first direction, the upper clutch plate rotation supporting element first end 5122 is adjacent to a corresponding lower clutch plate rotation supporting element first end 5106. Continued lateral rotation in the first direction causes the upper clutch plate rotation supporting element first end 5122 to laterally move along the corresponding lower clutch plate rotation supporting element 4104 until the upper clutch plate rotation supporting element first end 5122 is adjacent to the corresponding lower clutch plate rotation supporting element second end 5108, and the upper clutch plate rotation supporting element second end 5124 is adjacent to the lower clutch plate rotation supporting element first end 5106.

Further continued lateral rotation in the first direction causes the upper clutch plate rotation supporting element first end 5122 to be laterally spaced from the corresponding lower clutch plate rotation supporting element second end 5108, and the upper clutch plate rotation supporting element second end 5124 to be adjacent to the corresponding lower clutch plate rotation supporting element second end 5108. Further continued lateral rotation in the first direction causes the upper clutch plate rotation supporting element second end 5124 to be laterally spaced from the corresponding lower clutch plate rotation supporting element second end 5108, and the upper clutch plate rotation supporting element first end 5122 to be adjacent to another lower clutch plate rotation supporting element first end 5106, when provided. Lateral rotation of the upper clutch plate rotation supporting element 4120 in a second direction, which may be opposite to the first direction, causes the upper clutch plate rotation supporting element locking edge 5126 to contact a corresponding lower clutch plate rotation supporting element locking edge 5110. The contact of the upper and lower clutch plate rotation supporting element locking edges 5126, 5110 prevents the upper clutch plate 472 from laterally rotating over the lower clutch plate 470 in the second direction.

Referring back to FIG. 1, a lug 1128 is located in at least one of the yoke upper portion 204 and the yoke central portion 208. The lug 1128 has a lug inner lumen 1130 and a lug outer wall 1132. The lug inner lumen 1130 is radially spaced, and oppositely facing, from the lug outer wall 1132. The lug inner lumen 1130 may be at least partially threaded. The lug inner lumen 1130 may be larger in diameter than the adjustment screw outer wall lower threaded portion 362. The threading of the lug inner lumen 1130 is for at least partially engaging the adjustment screw outer wall lower threaded portion 362. The lug 1128 may hold the adjustment screw 334 in place, in relation to at least one of the selector housing 330 and the yoke 102, when the lug 1128 is at least partially engaged with the adjustment screw outer wall lower threaded portion 362.

Figure 7:
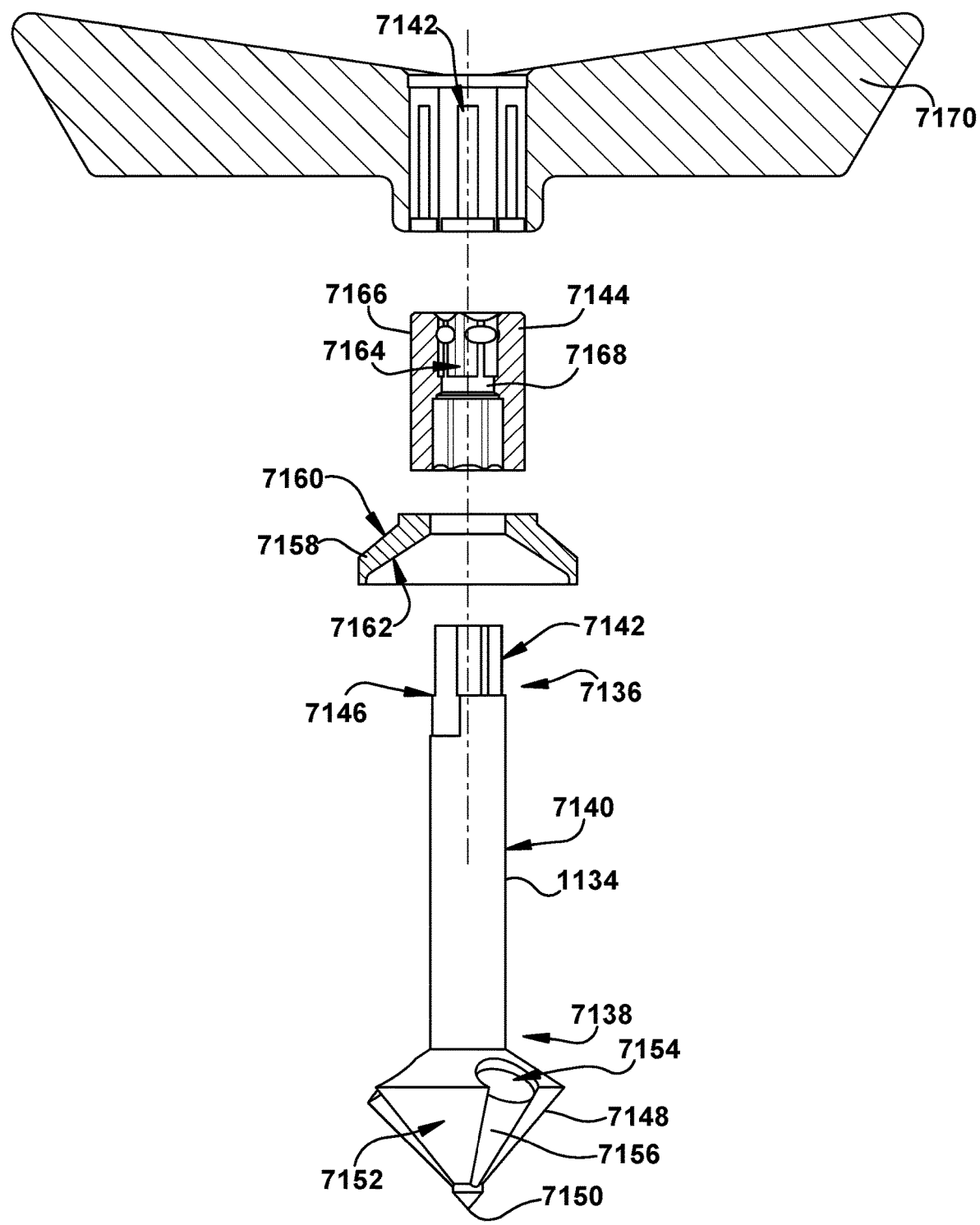
FIG. 7 is a front partial cross-sectional view of elements of the aspect of FIG. 1.

As shown in FIGS. 1 and 7, the adjustable insertion-depth tube flaring tool 100 has a shaft 1134. As shown in FIG. 7, the shaft 1134 has a shaft proximal end 7136, a shaft distal end 7138, and a shaft body 7140 extending longitudinally between the shaft proximal end 7136 and the shaft distal end 7138. The shaft proximal end 7136 has a socket drive receiving portion 7142 for receiving a socket drive 7144 thereon. The shaft proximal end 7136 has an upper clutch plate receiving portion 7146. At least one of the socket drive receiving portion 7142 and the upper clutch plate receiving portion 7146 may be smaller in diameter than the shaft body 7140. At least one of the socket drive receiving portion 7142 and the upper clutch plate receiving portion 7146 may be smaller in diameter than the upper clutch plate inner wall 4116. The shaft body 7140 may at least partially longitudinally extend through the clutch assembly 164. The shaft body 7140 may have a smaller outer diameter than the diameters of all of the clutch threaded portion inner lumen 486, the biasing element inner wall 492, and the lower clutch plate inner wall 498. The upper clutch plate receiving portion 7146 and the upper clutch plate inner wall 4116 being shaped to interact with one another in such a manner that the upper clutch plate 472 is selectively prevented from rotating about the upper clutch plate receiving portion 7146 when the upper clutch plate 472 is disposed on the upper clutch plate receiving portion 7146. The shaft body 7140 may have a larger outer diameter than the diameter of the upper clutch plate inner wall 4116.

The shaft distal end 7138 has a flaring cone 7148. The flaring cone 7148 has a flaring cone apex 7150 which may point longitudinally downward and toward the yoke lower portion 206. The flaring cone 7148 has a tube flaring surface 7152 and at least one roller recess 7154 for at least partially receiving a roller 7156. The roller 7156 may be conically shaped. In such case, the roller recess 7154 may be conically shaped in order to receive the roller 7156. The roller 7156 and the roller recess 7154 may be any desired shape, such as, but not limited to, cylindrical, conical, and spherical.

A roller retainer 7158 has a roller retainer inner surface 7160 and a roller retainer outer surface 7162. At least a portion of the roller retainer inner surface 7160 may be larger in diameter than the shaft body 7140. At least a portion of the roller retainer inner surface 7160 may be shaped to prevent the at least one roller 7156 from egressing a corresponding roller recess 7154 when the roller retainer 7158 is disposed on the shaft body 7140 and the flaring cone 7148.

The socket drive 7144 has a socket drive inner lumen 7164 that is defined by a socket drive outer wall 7166. At least a portion of the socket drive inner lumen 7164 may be larger in diameter than the socket drive receiving portion 7142 of the shaft 1134. The socket drive inner lumen 7164 may have a shaft stop 7168. The shaft stop 7168 may have an inner diameter that is smaller than the socket drive receiving portion 7142 of the shaft 1134.

A handle 7170 has a handle inner lumen 7172. The handle inner lumen 7172 may be larger in diameter than the diameter of the socket drive outer wall 7166. The socket drive 7144 may be received in the handle inner lumen 7172 so that the handle 7170 is attached to the socket drive outer wall 7166. When the socket drive 7144 is received in the handle inner lumen 7172, the combined socket drive 7144 and handle 7170 may be disposed on the socket drive receiving portion 7142 of the shaft 1134. Thus, the handle 7170 may be attached to the shaft proximal end 7136 through the socket drive 7144.

Figure 8:
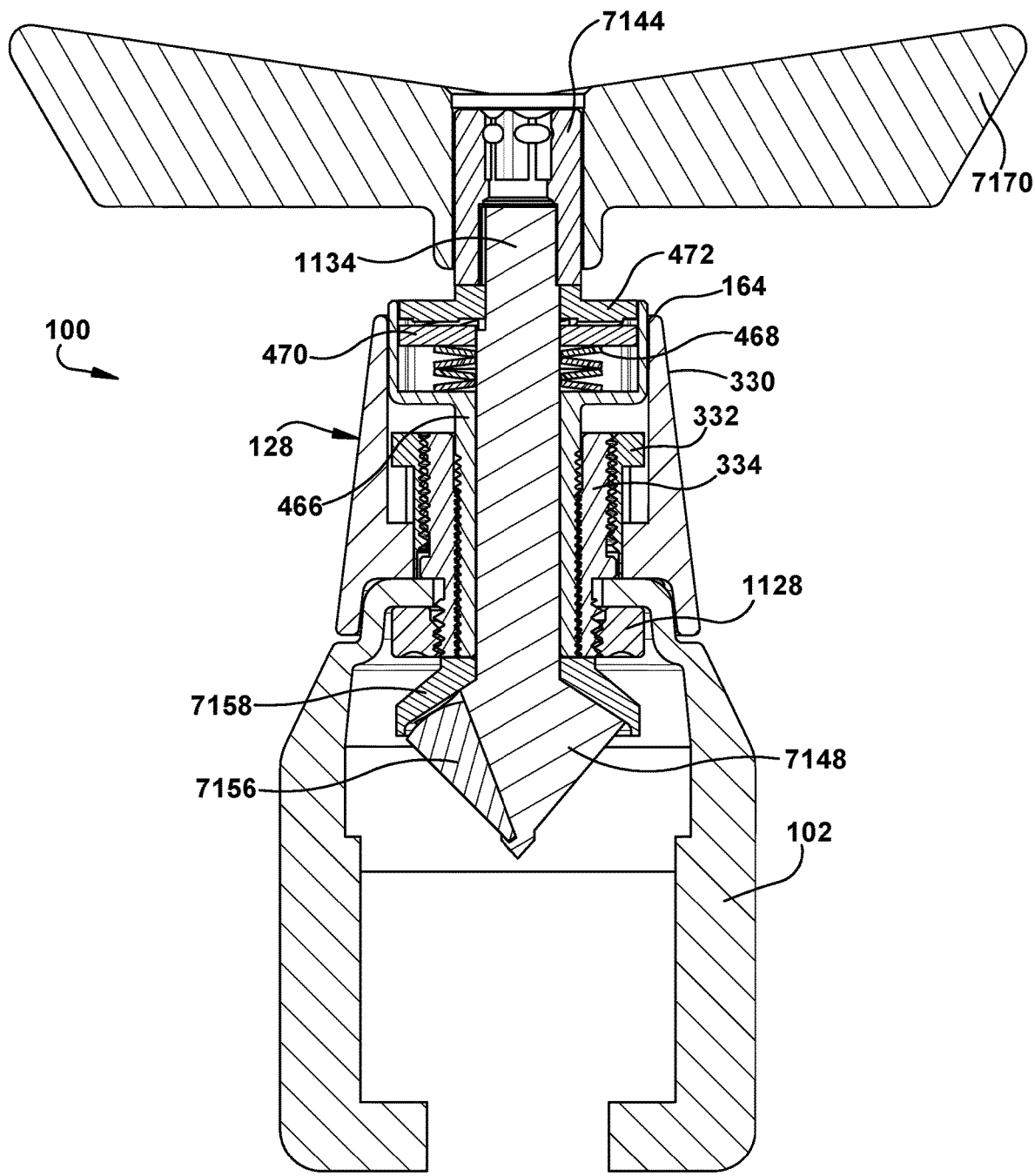
FIGS. 8-13 illustrate an example sequence of operation of a portion of the aspect of FIG. 1.
Figure 9:
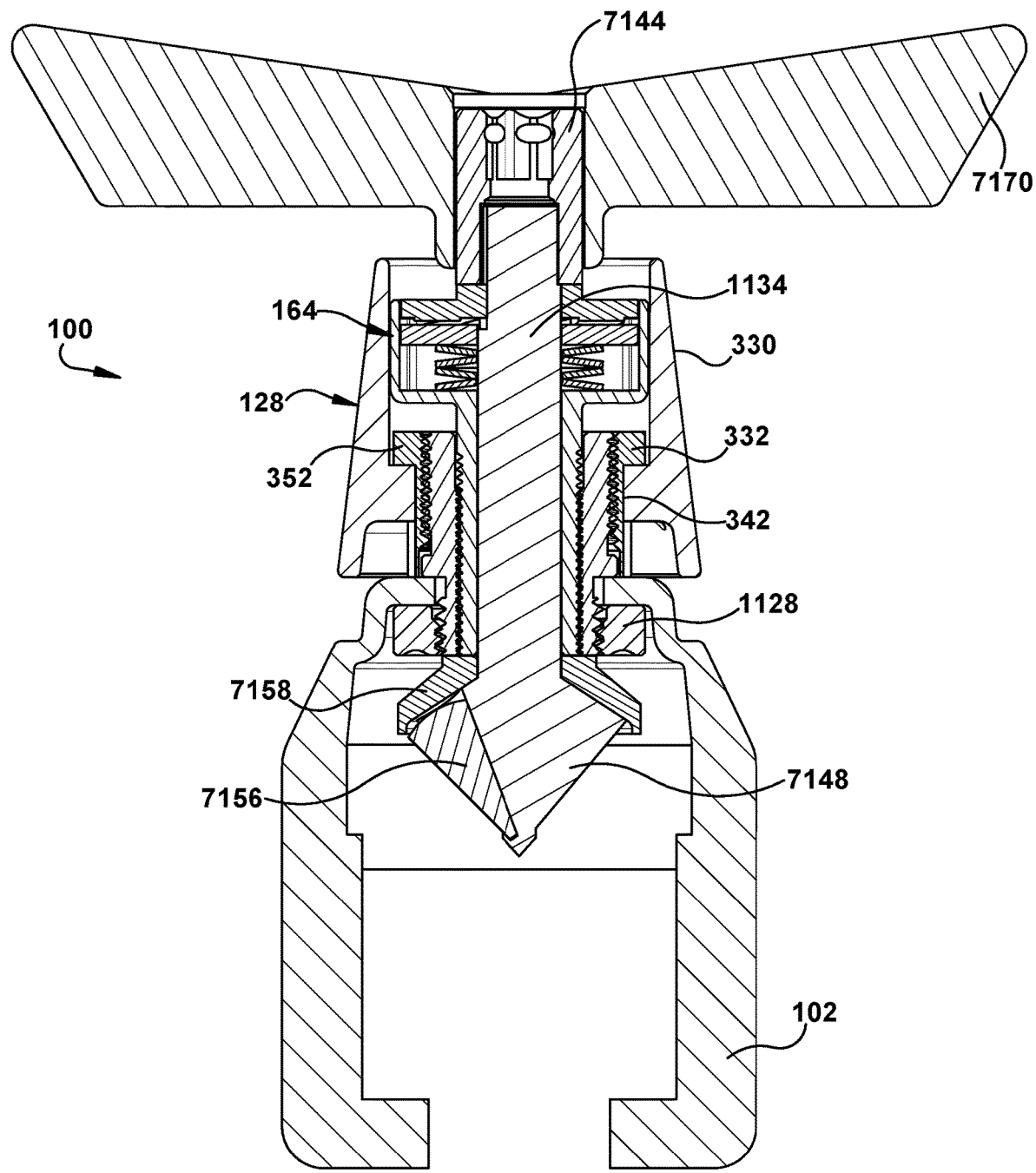

As shown in FIG. 8, in use, the adjustable insertion-depth tube flaring tool 100, as described above, is provided. As shown in FIG. 9, the selector housing 330 is moved longitudinally upward to cause the selector housing 330 to operatively engage the adjustment nut 332. When the selector housing 330 operatively engages the adjustment nut 332, at least a portion of the selector housing inner wall central portion 342 contacts at least a portion of the adjustment nut rim 352.

Figure 10:
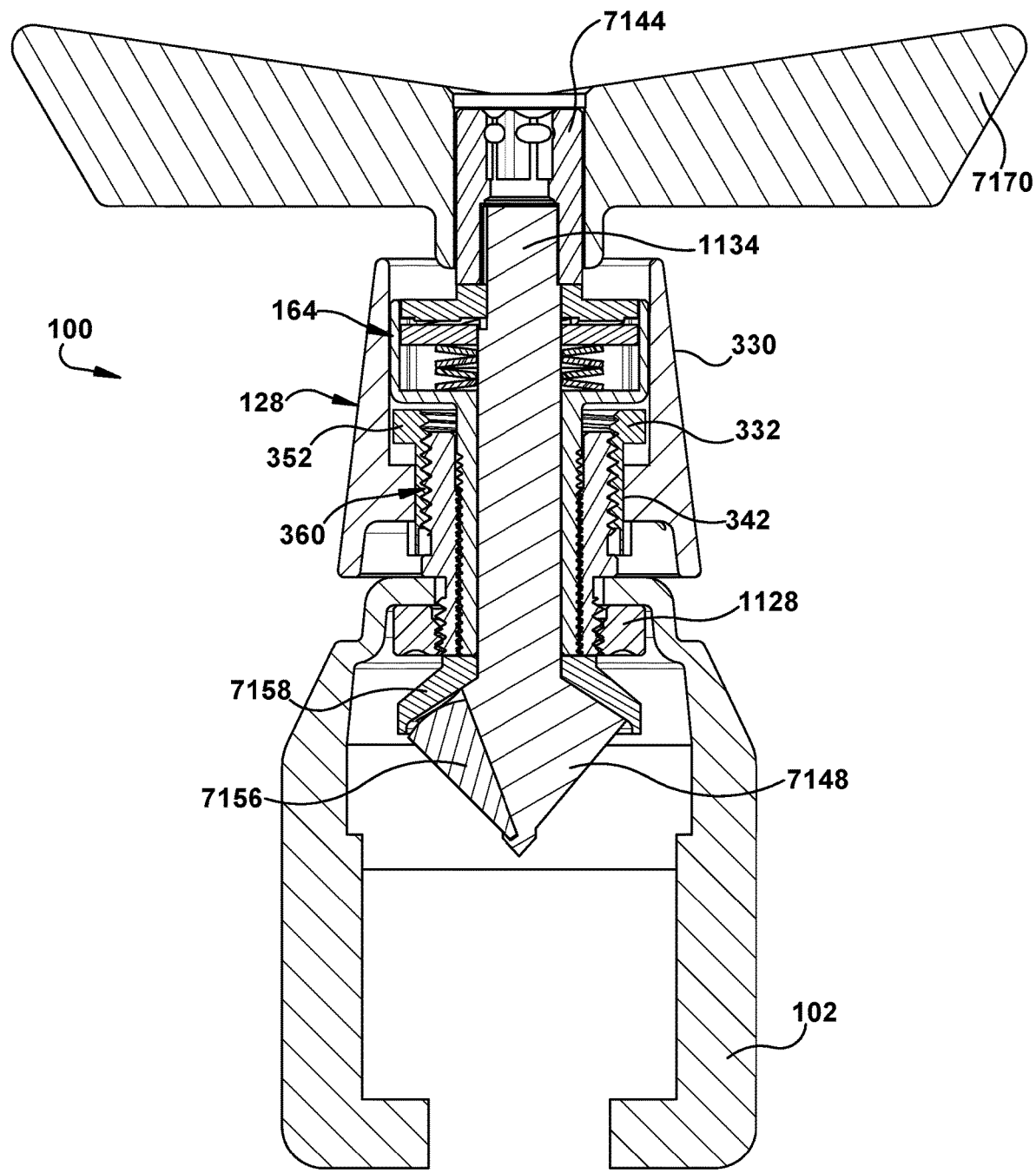
Figure 11:
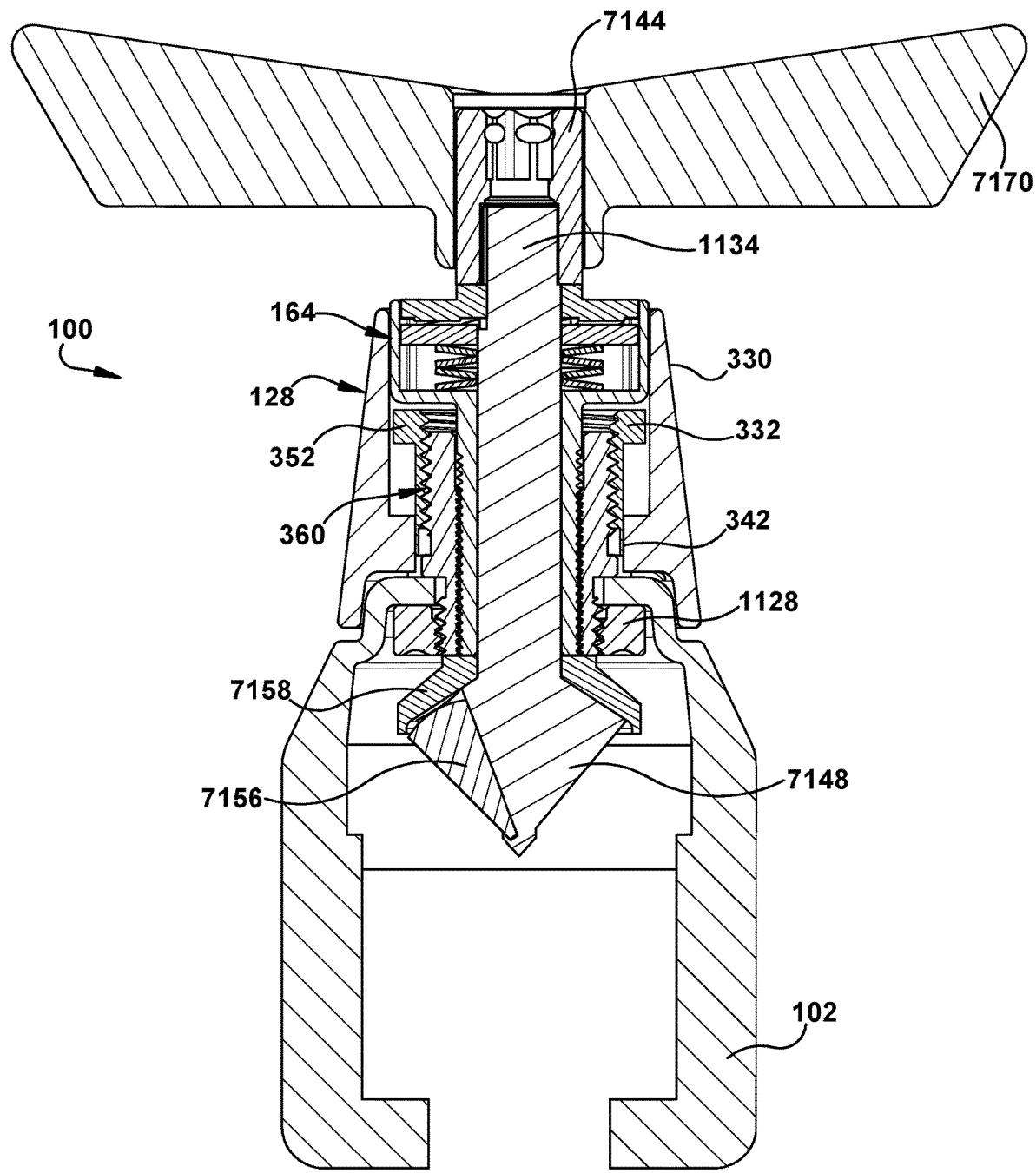

As shown in FIG. 10, with the selector housing 330 operatively engaging the adjustment nut 332, the selector housing 330 is laterally rotated a predetermined distance to select a predetermined longitudinal distance for the shaft 1134 to travel longitudinal downward. The predetermined distance may be the desired distance corresponding to a specific tube size, a tube shape, and/or dimensions of a desired tube flare. The lateral rotation of the selector housing 330 causes the operatively engaged adjustment nut 332 to travel longitudinally upward or downward along the adjustment screw outer wall upper threaded portion 360. As shown in FIG. 11, after the adjustment nut 332 is moved longitudinally upward or downward along the adjustment screw outer wall upper threaded portion 360, the selector housing 330 may be moved longitudinally downward to cause the selector housing 330 to operatively disengage the adjustment nut 332.

Figure 12:
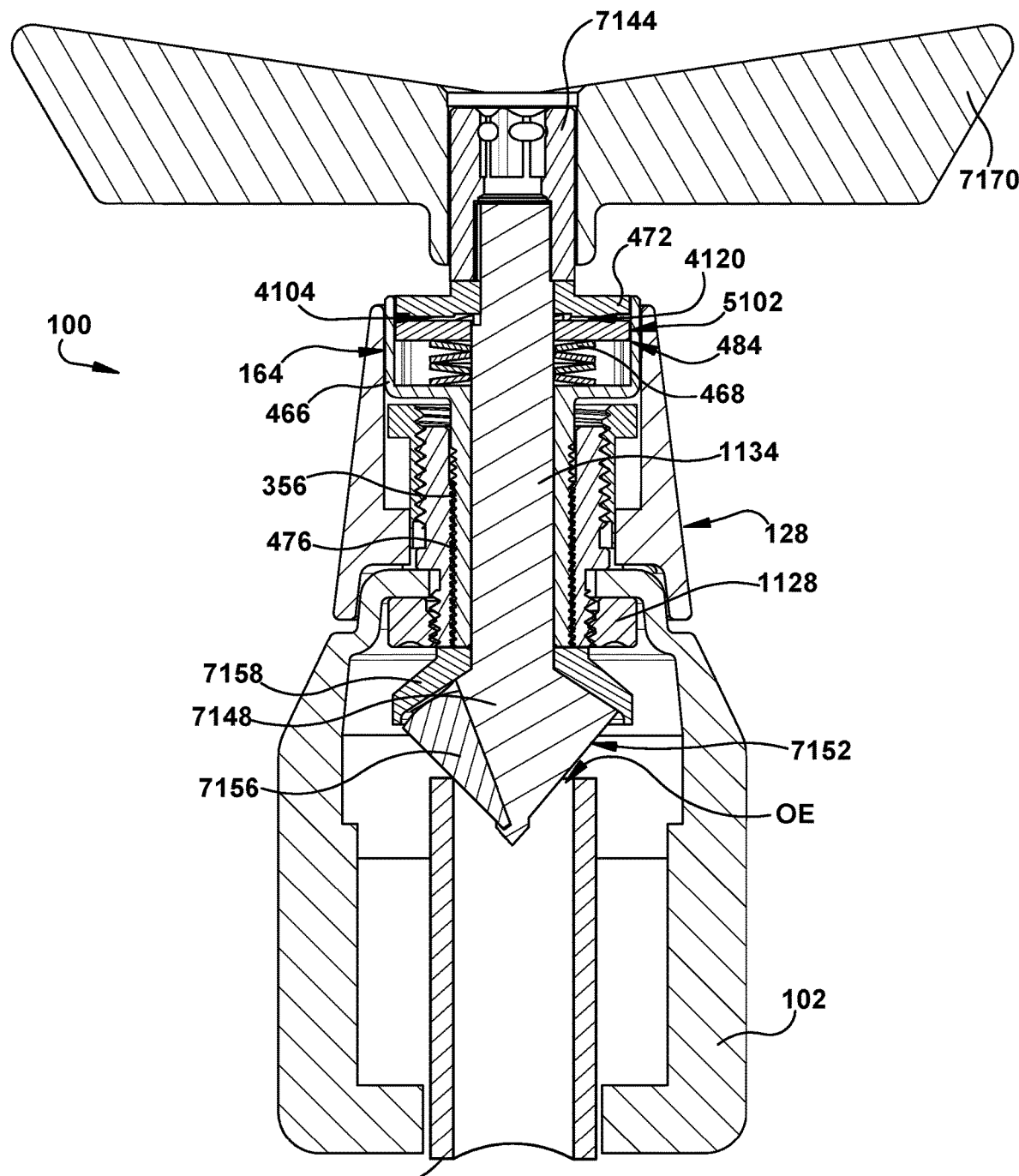

As shown in FIG. 12, a tube T is inserted longitudinally upward through the yoke 102 until an open end of the tube T at least partially contacts the tube flaring surface 7152 of the flaring cone 7148. The handle 7170 is laterally rotated, such as in a first direction, to drive the shaft 1134, the flaring cone 7148, and the clutch 466 the predetermined distance longitudinally downward. The lateral rotation of the handle 7170 causes the shaft 1134 to laterally rotate. The lateral rotation of the shaft 1134 causes the upper clutch plate 472 to laterally rotate, such as in the first direction. The upper clutch plate rotation supporting element 4120 interacts with the lower clutch plate rotation supporting element 4104 in such a manner that the rotation of the upper clutch plate 472 causes at least one of the clutch 466, the biasing element 468, and the lower clutch plate 470 to laterally rotate.

In other words, to facilitate the longitudinally downward movement of the shaft 1134, the upper clutch plate rotation supporting element 4120 is engaged to the lower clutch plate rotation supporting element 4104 so that the upper clutch plate 472 is prevented from laterally rotating over the lower clutch plate 470 in the first direction. This is because the biasing element 468 may bias the upper and lower clutch plates 472, 470 together in such a manner that the upper clutch plate 472 is prevented from laterally rotating with respect to the lower clutch plate 470. The lower clutch plate 470 is prevented from laterally rotating within the clutch housing 474 because at least one lower clutch plate projection 5102 is received within a corresponding lower clutch plate projection recess 484 of the clutch 466. Because the upper clutch plate 472 is prevented from rotating over the lower clutch plate 470, and the lower clutch plate 470 is engaged to the clutch 466 in such a manner that the lower clutch plate 470 is prevented from rotating within the clutch housing 474, the lateral rotation of the upper clutch plate 472 in the first direction causes the lower clutch plate 470 to laterally rotate in the first direction, which directly correspondingly causes the clutch 466 to laterally rotate in the first direction. The lateral rotation of the clutch 466 in the first direction causes the clutch threaded portion 476, and thus the clutch assembly 164, to move longitudinally downward along the adjustment screw inner lumen 356. The longitudinal downward movement of the clutch assembly 164 causes the shaft 1134, and the flaring cone 7148, to correspondingly move longitudinally downward because the shaft 1134 is engaged to the clutch assembly 164 through the contact between the socket drive 7144 and the upper clutch plate 472.

Figure 13:
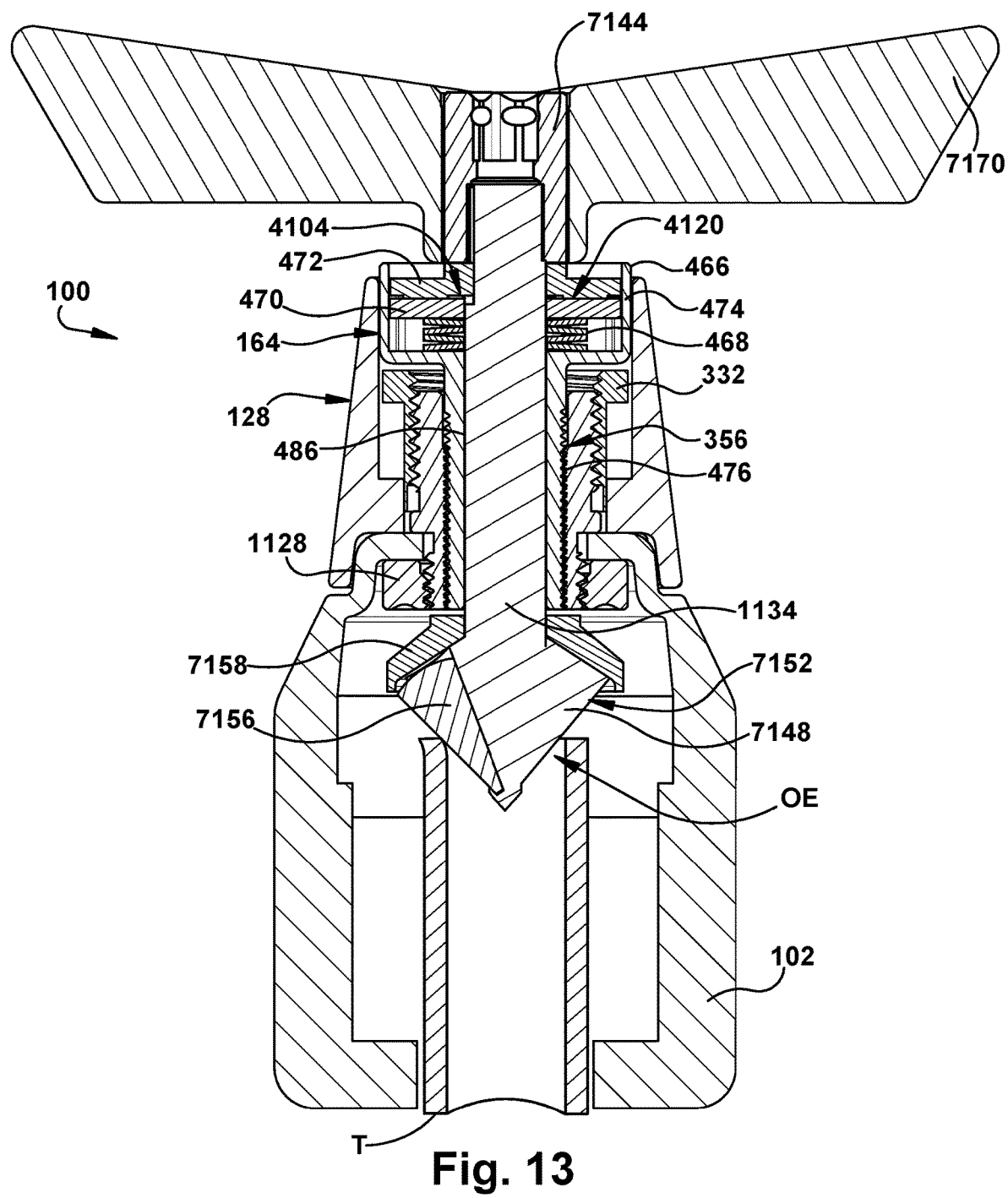

As shown in FIG. 13, the driving of the flaring cone 7148 longitudinally downward causes the flaring cone 7148 to move longitudinally downward into the open end OE of the tube T. After the shaft 1134, the flaring cone 7148, and the clutch 466 have traveled the predetermined distance longitudinally downward, the shaft 1134, the flaring cone 7148, and the clutch 466 are prevented from traveling further longitudinally downward. The shaft 1134, the flaring cone 7148, and the clutch 466 are prevented from traveling further longitudinally downward than the predetermined distance because at least a portion of the clutch housing 474 contacts at least a portion of the adjustment nut 332 after moving longitudinally downward the predetermined distance. The contact between the clutch housing 474 and adjustment nut 332 prevents the clutch 466, the shaft 1134, and the flaring cone 7148 from traveling further longitudinally downward than the predetermined distance.

As described above, as the shaft 1134 is traveling longitudinally downward, the biasing element 468 may bias the upper and lower clutch plates 472, 470 together in such a manner that the upper clutch plate 472 is prevented from rotating with respect to the lower clutch plate 470. Although the shaft 1134 is able to be collectively laterally rotated with the clutch assembly 164 to move the clutch assembly 164 longitudinal downward, when the upper clutch plate 472 is prevented from rotating with respect to the lower clutch plate 470, the shaft 1134 and the flaring cone 7148 are unable to rotate with respect to the clutch threaded portion inner lumen 486. This is because of the engagement of the upper clutch plate 472, the lower clutch plate 470, and the lower clutch plate projection recess 484 causes the shaft 1134, the flaring cone 418, and the clutch 446 to laterally rotate collectively.

With the flaring cone 7148 at least partially within the tube T and the shaft 1134 prevented from traveling further longitudinally downward than the predetermined distance, the tube T is flared by laterally rotating the handle 7170 in the first direction to cause the shaft 1134 and the flaring cone 7148 to rotate in the first direction with respect to the clutch threaded portion inner lumen 486, and the flaring cone 7148 to laterally rotate in the first direction within the tube T. The shaft 1134 and the flaring cone 7148 are able to laterally rotate in the first direction with respect to the clutch threaded portion inner lumen 486 because with the clutch assembly 164 prevented from traveling further longitudinally downward, a driving force that would be used to drive the clutch assembly 164 longitudinally downward is used to overcome the bias of the biasing element 468. Overcoming the bias of the biasing element 468 allows the upper clutch plate 472 to rotate over the lower clutch plate 470 in the first direction.

Thus, when the shaft 1134 is prevented from traveling further longitudinally downward than the predetermined distance, rotating the handle 7170 causes the upper clutch plate 472 to rotate with respect to the lower clutch plate 740 and overcomes the bias of the biasing element 468. The lateral rotation of the upper clutch plate 472 with respect to the lower clutch plate 470 permits the shaft 1134 and the flaring cone 7148 to mutually rotate with respect to the clutch threaded portion inner lumen 486. The upper clutch plate rotation supporting element 4120 may interact with the lower clutch plate rotation supporting element 4104 to facilitate lateral rotation of the upper clutch plate 472 with respect to the lower clutch plate 470 in a ratcheting manner.

In other words, when the upper clutch plate 472 laterally rotates over the lower clutch plate 470 in the first direction, the upper clutch plate rotation supporting element first end 5122 is adjacent to a corresponding lower clutch plate rotation supporting element first end 5106. Continued lateral rotation in the first direction causes the upper clutch plate rotation supporting element first end 5122 to laterally move along the corresponding lower clutch plate rotation supporting element 4104 until the upper clutch plate rotation supporting element first end 5122 is adjacent to the corresponding lower clutch plate rotation supporting element second end 5108, and the upper clutch plate rotation supporting element second end 5124 is adjacent to the lower clutch plate rotation supporting element first end 5106. Further continued lateral rotation in the first direction causes the upper clutch plate rotation supporting element first end 5122 to be laterally spaced from the corresponding lower clutch plate rotation supporting element second end 5108, and the upper clutch plate rotation supporting element second end 5124 to be adjacent to the corresponding lower clutch plate rotation supporting element second end 5108.

As the upper clutch plate rotation supporting element second end 5124 moves toward the corresponding lower clutch plate rotation supporting element second end 5108, the biasing element 468 is forced longitudinally downward away from a bias position. This occurs after the clutch assembly 164 is prevented from traveling longitudinally downward because the driving force that was used to drive the clutch assembly 164 longitudinally downward is now used to move the upper clutch plate rotation supporting element second end 5124 toward the corresponding lower clutch plate rotation supporting element second end 5108. This causes the biasing element 468 to move away from the bias position, and thus overcome the bias of the biasing element 468. However, when the clutch assembly 164 is able to travel longitudinally downward, the driving force that would be required to overcome the bias of the biasing element 468 is instead used to drive the clutch assembly 164 longitudinally downward.

Further continued lateral rotation in the first direction causes the upper clutch plate rotation supporting element second end 5124 to be laterally spaced from the corresponding lower clutch plate rotation supporting element second end 5108, and the upper clutch plate rotation supporting element first end 5122 to be adjacent to another lower clutch plate rotation supporting element first end 5106, when provided. When the upper clutch plate rotation supporting element second end 5124 is laterally rotated in the first direction to be laterally spaced from the corresponding lower clutch plate rotation supporting element second end 5108, the biasing element 468 returns to the bias position in a spring-action type motion. The motion of the biasing element 468 away from the bias position, and then back to the bias position in the spring-action type motion causes the "ratcheting" effect of the lateral rotation of the upper clutch plate 472 with respect to the lower clutch plate 470.

When the user desires to drive the clutch assembly 164, the shaft 1134, and the flaring cone 7148 longitudinally upward, the user may rotate the handle 7170 in a second direction, which may be in a direction opposite to the first direction. Rotation of the handle 7170 in the second direction causes the upper clutch plate 472 to rotate in the second direction. Lateral rotation of the upper clutch plate 472 in the second direction causes the upper clutch plate rotation supporting element locking edge 5126 to contact a corresponding lower clutch plate rotation supporting element locking edge 5110.

The contact of the upper and lower clutch plate rotation supporting element locking edges 5126, 5110 prevents the upper clutch plate 472 from laterally rotating over the lower clutch plate 470 in the second direction. Because the upper clutch plate 472 is prevented from laterally rotating over the lower clutch plate 470 in the second direction, and the lower clutch plate 470 is engaged to the clutch 466 in such a manner that the lower clutch plate 470 is prevented from rotating within the clutch housing 474, the lateral rotation of the upper clutch plate 472 in the second direction causes the lower clutch plate 470 to laterally rotate in the second direction, which directly correspondingly causes the clutch 466 to laterally rotate in the second direction. The rotation of the clutch 466 in the second direction causes the clutch threaded portion 476, and thus the clutch assembly 164, to move longitudinally upward along the adjustment screw inner lumen 356. The longitudinal upward movement of the clutch assembly 164 causes the shaft 1134, and the flaring cone 7148, to correspondingly move longitudinally upward because the shaft 1134 is engaged to the clutch assembly 164 through the contact between the socket drive 7144 and the upper clutch plate 472.

In summary, a person having ordinary skill in the art will understand that, in an aspect, the adjustable insertion-depth tube flaring tool 100 may comprise:

a yoke 102 having a yoke upper portion 204, a yoke lower portion 206, and a yoke central portion 208 longitudinally extending between the yoke upper portion 204 and the yoke lower portion 206, the yoke upper portion 204 having a yoke opening 210 and a radially extending yoke shoulder 212, the yoke shoulder 212 having a yoke shoulder outer surface 214 and a yoke shoulder inner surface 216, the yoke central portion 208 having a yoke central portion inner wall 218 and a yoke central portion outer wall 220, the yoke lower portion 206 having at least two yoke arms 222 that extend longitudinally downward from the yoke central portion 208, each of the yoke arms 222 having a yoke arm longitudinal portion 224 and a yoke arm lateral portion 226, the yoke arm longitudinal portion 224 being substantially perpendicular to the yoke arm lateral portion 226, each of the yoke arm lateral portions 226 laterally extending toward, and oppositely facing from, another of the yoke arm lateral portions 226;

a selector assembly 128 including a selector housing 330, the selector housing 330 having a selector housing inner wall 336 and a selector housing outer wall 338, the selector housing inner wall 336 being laterally spaced, and oppositely facing, from the selector housing outer wall 338, the selector housing inner wall 336 having a selector housing inner wall upper portion 340, a selector housing inner wall central portion 342, and a selector housing inner wall lower portion 344, the selector housing inner wall central portion 342 having at least one adjustment nut projection recess 346, the selector housing inner wall central portion 342 being smaller in diameter than the yoke shoulder outer surface 214, the selector housing inner wall lower portion 344 being larger in diameter than, and being disposed on, the yoke shoulder outer surface 214, an adjustment nut 332, the adjustment nut 332 having an adjustment nut inner lumen 348 and an adjustment nut outer wall 350, the adjustment nut inner lumen 348 being at least partially threaded, the adjustment nut outer wall 350 being larger in diameter than the yoke opening 210, the adjustment nut outer wall 350 having a radially extending adjustment nut rim 352 and at least one adjustment nut projection 354, the adjustment nut rim 352 having an outer diameter that is smaller than the selector housing inner wall upper portion 340, and is larger than diameter of the selector housing inner wall central portion 342, the at least one adjustment nut projection 354 extending longitudinally downward from the adjustment nut rim 352, the adjustment nut projection 354 slidingly engaging the adjustment nut projection recess 346 of the selector housing 330, and an adjustment screw 334 disposed within at least one of the selector housing 330 and the yoke 102, the adjustment screw 334 having an adjustment screw inner lumen 356 and an adjustment screw outer wall 358, the adjustment screw inner lumen 356 being at least partially threaded, the adjustment screw outer wall 358 having an adjustment screw outer wall upper threaded portion 360 and an adjustment screw outer wall lower threaded portion 362, the adjustment screw outer wall upper threaded portion 360 being larger in diameter than the adjustment screw outer wall lower threaded portion 362, the adjustment screw outer wall upper threaded portion 360 being smaller in diameter than the adjustment nut inner lumen 348, the adjustment screw outer wall upper threaded portion 360 for at least partially engaging a threaded portion of the adjustment nut inner lumen 348, the adjustment screw outer wall upper threaded portion 360 being larger in diameter than the yoke opening 210, the adjustment screw outer wall lower threaded portion 362 being smaller in diameter than the yoke opening 210;

a clutch assembly 164 including a clutch 466 having a clutch housing 474 and a clutch threaded portion 476, the clutch housing 474 having a clutch housing recess 478 that is defined by a clutch housing inner wall 480 and a clutch housing recess floor 482, the clutch housing inner wall 480 having at least one lower clutch plate projection recess 484, the clutch threaded portion 476 extending longitudinally downwardly from the clutch housing recess floor 482, the clutch threaded portion 476 having a clutch threaded portion inner lumen 486, the clutch threaded portion inner lumen 486 being in fluid communication with the clutch housing recess 478, the clutch threaded portion inner lumen 486 being smaller in diameter than the diameter of the clutch housing recess 478, the clutch threaded portion 476 having a clutch threaded portion outer wall 488 which is at least partially threaded, the clutch threaded portion outer wall 488 being smaller in diameter than the adjustment screw inner lumen 356, the clutch threaded portion outer wall 488 for at least partially engaging the threading on the adjustment screw inner lumen 356, at least one biasing element 468 disposed in the clutch housing recess 478, the at least one biasing element 468 having a biasing element outer wall 490 and a biasing element inner wall 492, the biasing element outer wall 490 being smaller in diameter than the diameter of the clutch housing inner wall 480, a lower clutch plate 470 being disposed in the clutch housing recess 478 on the at least one biasing element 468, the lower clutch plate 470 having a lower clutch plate first surface 494 and a lower clutch place second surface 496, the lower clutch plate first surface 494 being longitudinally spaced from the lower clutch plate second surface 496, the lower clutch plate 470 having a lower clutch plate inner wall 498 and a lower clutch plate outer wall 4100, the lower clutch plate inner wall 498 being radially spaced, and oppositely facing, from the lower clutch plate outer wall 4100, the lower clutch plate inner wall 498 and the lower clutch plate outer wall 4100 both longitudinally extending between the lower clutch plate first surface 494 and the lower clutch plate second surface 496, the lower clutch plate outer wall 4100 being smaller in diameter than the diameter of the clutch housing inner wall 480, the lower clutch plate outer wall 4100 having at least one lower clutch plate projection 5102 for at least partially engaging a corresponding lower clutch plate projection recess 484 in the clutch housing inner wall 480, the engagement of the lower clutch plate projection 5102 in the corresponding lower clutch plate projection recess 484 substantially preventing the rotation of the lower clutch plate 470 in the clutch housing recess 478, the lower clutch plate first surface 494 having at least one lower clutch plate rotation supporting element 4104, and at least one upper clutch plate 472 being at least partially located in the clutch housing recess 478 on the lower clutch plate 470, the upper clutch plate 472 having an upper clutch plate first surface 4112 and an upper clutch place second surface 4114, the upper clutch plate first surface 4112 being longitudinally spaced from the upper clutch plate second surface 4114, the upper clutch plate 472 having an upper clutch plate inner wall 4116 and an upper clutch plate outer wall 4118, the upper clutch plate inner wall 4116 being radially spaced, and oppositely facing, from the upper clutch plate outer wall 4118, the upper clutch plate inner wall 4116 and the upper clutch plate outer wall 4118 both longitudinally extending between the upper clutch plate first surface 4112 and the upper clutch plate second surface 4114, the upper clutch plate outer wall 4118 being smaller in diameter than the diameter of the clutch housing inner wall 480, the upper clutch plate second surface 4114 having at least one upper clutch plate rotation supporting element 4120, the upper clutch plate rotation supporting element 4120 interacting with the lower clutch plate rotation supporting element 4104 to facilitate rotation of the upper clutch plate 472 over the lower clutch plate 470 in one direction;

a lug 1128 being located in at least one of the yoke upper portion 204 and the yoke central portion 208, the lug 1128 having a lug inner lumen 1130 and a lug outer wall 1132, the lug inner lumen 1130 being radially spaced, and oppositely facing, from the lug outer wall 1132, the lug inner lumen 1130 being at least partially threaded, the lug inner lumen 1130 being larger in diameter than the adjustment screw outer wall lower threaded portion 362, the threading of the lug inner lumen 1130 for at least partially engaging the adjustment screw outer wall lower threaded portion 362, the lug 1128 holding the adjustment screw 334 in place, in relation to at least one of the selector housing 330 and the yoke 102, when the lug 11280 is at least partially engaged with the adjustment screw outer wall lower threaded portion 362;

a shaft 1134 having a shaft proximal end 7136, a shaft distal end 7138, and a shaft body 7140 extending longitudinally between the shaft proximal end 7136 and the shaft distal end 7138, the shaft proximal end 7136 having a socket drive receiving portion 7142 for receiving a socket drive 7144 thereon, the shaft proximal end 7136 having an upper clutch plate receiving portion 7146, the upper clutch plate receiving portion 7146 being smaller in diameter than the shaft body 7140, the upper clutch plate receiving portion 7146 being smaller in diameter than the upper clutch plate inner wall 4116, the shaft body 7140 having a smaller outer diameter than the diameters of all of the clutch threaded portion inner lumen 486, the biasing element inner wall 492, and the lower clutch plate inner wall 498, the shaft body 7140 having a larger outer diameter than the diameter of the upper clutch plate inner wall 4116, the shaft distal end 7138 having a flaring cone 7148, the flaring cone 7148 having a flaring cone apex 7150 which points toward the yoke lower portion 206, the flaring cone 7148 having a tube flaring surface 7152 and at least one roller recess 7154 for at least partially receiving a roller 7156;

a roller retainer 7158 having a roller retainer inner surface 7160 and a roller retainer outer surface 7162, at least a portion of the roller retainer inner surface 7160 being larger in diameter than the shaft body 7140, at least a portion of the roller retainer inner surface 7160 being shaped to prevent the at least one roller 7156 from egressing a corresponding roller recess 7154 when the roller retainer 7158 is disposed on the shaft body 7140 and the flaring cone 7148;

the socket drive 7144 having a socket drive inner lumen 7164 being defined by a socket drive outer wall 7166, at least a portion of the socket drive inner lumen 7164 being larger in diameter than the socket drive receiving portion 7142 of the shaft 1134, the socket drive inner lumen 7164 having a shaft stop 7168, the shaft stop 7168 having a shaft stop 7168 inner diameter that is smaller than the socket drive receiving portion 7142 of the shaft 1134; and a handle 7170 having a handle inner lumen 7172, the handle inner lumen 7172 being larger in diameter than the diameter of the socket drive outer wall 7166;

wherein the upper clutch plate receiving portion 7146 and the upper clutch plate inner wall 4116 being shaped to interact with one another in such a manner that the upper clutch plate 472 is selectively prevented from rotating about the upper clutch plate receiving portion 7146 when the upper clutch plate 472 is disposed on the upper clutch plate receiving portion 7146.

The adjustable insertion-depth tube flaring tool 100 may assist the user in expanding the internal and/or external dimensions of an open end OE of a tube T. Further, the use of the selector assembly 128 to adjust the insertion-depth, i.e., the predetermined longitudinally downward distance, of the shaft 1134 and the flaring cone 7148 allows the user to flare tubes T of varying sizes and shapes with a single tool. For example, a first tube with a small diameter may only require a small predetermined longitudinally downward distance for the shaft 1134 and the flaring cone 7148 to travel in order to obtain the desired flaring dimensions. However, a second tube with a larger diameter than the first tube may require a larger predetermined longitudinally downward distance for the shaft 1134 and the flaring cone 7148 to travel than the first tube in order to obtain the desired flaring dimensions. Being able to selectively adjust the predetermined longitudinally downward distance that the shaft 1134 and the flaring cone 7148 travel allows the adjustable insertion-depth tube flaring tool 100 to flare both the first and second tubes to the desired flaring dimensions with a single tool.

Additionally, being able to adjust the predetermined longitudinally downward distance that the shaft 1134 and the flaring cone 7148 travel also grants the user the ability to flare tubes T to various flaring dimensions with a single tool. For example, if the user desired flaring a tube T to a first flare dimension, the user could selectively adjust the selector assembly 128 to permit the shaft 1134 and the flaring cone 7148 to travel a first predetermined longitudinally downward distance into an open end OE of the tube T. If the user desired flaring a tube T to a second flare dimension, the user could selectively adjust the selector assembly 128 to permit the shaft 1134 and the flaring cone 7148 to travel a second predetermined longitudinally downward distance into the open end OE of the tube T.

The adjustable insertion-depth tube flaring tool 100 may be at least partially formed from silicone, polyethylene, polypropylene, steel, titanium, any other appropriate metal, any other appropriate material, and/or any combination thereof.

It is contemplated that at least one of the yoke 102, the selector assembly 128, the clutch assembly 164, the lug 1128, when provided, the shaft 1134, the socket drive 7144, the flaring cone 7148, the roller retainer 7158, when provided, and the handle 7140 may be coaxially arranged relative to one another. The term "coaxially arranged" is used herein to indicate a positioning in which two or more elements have the same central longitudinal axis LX, such as the positioning of the yoke 102, the selector assembly 128, the clutch assembly 164, the lug 1128, the shaft 1134, the socket drive 7144, the flaring cone 7148, the roller retainer 7158, and the handle 7140 as shown in FIG. 1.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A method for flaring a tube, the method comprising:
providing an adjustable insertion-depth tube flaring tool including
a yoke;
a selector housing having at least one adjustment nut projection recess, the selector housing being disposed on the yoke;
an adjustment nut disposed within the selector housing, an adjustment nut outer wall having at least one adjustment nut projection, the at least one adjustment nut projection slidingly engaging the at least one adjustment nut projection recess of the selector housing;

an adjustment screw disposed within at least one of the selector housing and the yoke, an adjustment screw outer wall upper threaded portion for at least partially engaging a threaded portion of an adjustment nut inner lumen;

a clutch having a clutch housing and a clutch threaded portion extending longitudinally downwardly from the clutch housing, the clutch housing having therein at least one biasing element, at least one lower clutch plate, and at least one upper clutch plate, the at least one lower clutch plate having a lower clutch plate rotation supporting element, the at least one upper clutch plate having an upper clutch plate rotation supporting element, the clutch threaded portion for at least partially engaging a threaded portion of an adjustment screw inner lumen;

a shaft having a shaft proximal end and a shaft distal end, at least a portion of the shaft proximal and an upper clutch plate inner wall being shaped to interact with one another in such a manner that the at least one upper clutch plate is selectively prevented from rotating about an upper clutch plate receiving portion of the shaft proximal end when the at least one upper clutch plate is disposed on the shaft proximal end, the shaft distal end having a flaring cone, and at least a portion of the shaft extending through the clutch; and a handle attached to the shaft proximal end;

moving the selector housing longitudinally upward to cause the selector housing to operatively engage the adjustment nut;

with the selector housing operatively engaging the adjustment nut, laterally rotating the selector housing a predetermined lateral rotation distance to select a predetermined longitudinal distance for the shaft to travel longitudinally downward, the lateral rotation of the selector housing causing the engaged adjustment nut to travel longitudinally upward or downward along the adjustment screw outer wall upper threaded portion;

moving the selector housing longitudinally downward to cause the selector housing to operatively disengage the adjustment nut;

inserting the tube longitudinally upward through the yoke until an open end of the tube at least partially contacts the flaring cone;

laterally rotating the handle to drive the shaft, the flaring cone, and the clutch the predetermined longitudinal distance longitudinally downward, the driving of the flaring cone longitudinally downward causing the flaring cone to move longitudinally downward into the open end of the tube; and with the flaring cone at least partially within the tube and the shaft prevented from traveling further longitudinally downward than the predetermined longitudinal distance, flaring the tube by laterally rotating the handle to cause the flaring cone to laterally rotate within the tube, the lateral rotation of the handle causing the shaft and the at least one upper clutch plate to laterally rotate, the upper clutch plate rotation supporting element interacting with the lower clutch plate rotation supporting element to facilitate rotation of the at least one upper clutch plate with respect to the at least one lower clutch plate in a ratcheting manner, the lateral rotation of the at least one upper clutch plate with respect to the at least one lower clutch plate permitting the shaft and the flaring cone to mutually rotate.

2. The method of claim 1, wherein the at least one biasing element biases the at least one upper and at least one lower clutch plates together in such a manner that the at least one upper clutch plate is prevented from rotating with respect to the at least one lower clutch plate, and when the shaft is prevented from traveling further longitudinally downward than the predetermined longitudinal distance, rotating the handle causes the at least one upper clutch plate to rotate with respect to the at least one lower clutch plate and overcomes the bias of the at least one biasing element.

3. The method of claim 1, including after the shaft, the flaring cone, and the clutch have traveled the predetermined longitudinal distance longitudinally downward, preventing the shaft, the flaring cone, and the clutch from traveling further longitudinally downward, the clutch housing contacting the adjustment nut after moving longitudinally downward the predetermined longitudinal distance causing the clutch, the shaft, and the flaring cone to be prevented from traveling further longitudinally downward than the predetermined longitudinal distance.

\* \* \* \* \*